United States Patent
Li et al.

(10) Patent No.: US 11,558,096 B2
(45) Date of Patent: Jan. 17, 2023

(54) PHYSICAL UPLINK CONTROL CHANNEL RESOURCE DETERMINATION METHOD AND COMMUNICATION DEVICE

(71) Applicant: VIVO MOBILE COMMUNICATION CO., LTD., Chang'an Dongguan (CN)

(72) Inventors: Na Li, Chang'an Dongguan (CN); Xiaodong Shen, Chang'an Dongguan (CN); Peng Sun, Chang'an Dongguan (CN); Yang Song, Chang'an Dongguan (CN); Xueming Pan, Chang'an Dongguan (CN); Xiaohang Chen, Chang'an Dongguan (CN); Zhi Lu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 2 days.

(21) Appl. No.: 17/038,654

(22) Filed: Sep. 30, 2020

(65) Prior Publication Data

US 2022/0045729 A1 Feb. 10, 2022

Related U.S. Application Data

(63) Continuation of application No. PCT/CN2019/080080, filed on Mar. 28, 2019.

(30) Foreign Application Priority Data

Mar. 30, 2018 (CN) .......................... 201810276613.6

(51) Int. Cl.
*H04W 72/04* (2009.01)
*H04B 7/06* (2006.01)
*H04L 1/18* (2006.01)
*H04L 5/00* (2006.01)
*H04W 72/12* (2009.01)

(52) U.S. Cl.
CPC ......... *H04B 7/0626* (2013.01); *H04L 1/1819* (2013.01); *H04L 5/0055* (2013.01); *H04W 72/042* (2013.01); *H04W 72/1263* (2013.01)

(58) Field of Classification Search
CPC ..... H04B 7/0626; H04B 7/063; H04L 1/1819; H04L 5/0055; H04L 5/00; H04L 5/0053;
(Continued)

(56) References Cited

U.S. PATENT DOCUMENTS

2014/0044083 A1 2/2014 Kim et al.
2014/0226608 A1* 8/2014 Seo ........................ H04L 5/0037
370/329
(Continued)

FOREIGN PATENT DOCUMENTS

CN 101378307 A 3/2009
CN 102263617 A 11/2011
(Continued)

OTHER PUBLICATIONS

Extended European Search Report for related Application No. 19775447.6; reported on Apr. 26, 2021.
(Continued)

*Primary Examiner* — Mahbubul Bar Chowdhury
(74) *Attorney, Agent, or Firm* — von Briesen & Roper, s.c.

(57) ABSTRACT

A physical uplink control channel resource determination method and a communication device are disclosed in embodiment of this disclosure. The method includes: determining a reference bit quantity of CSI-part 2 according to a preset rule; determining a sum of reference bit quantities of AN/SR and CSI according to the reference bit quantity, wherein the CSI at least includes: CSI-part 1 and the CSI-part 2; determining a target PUCCH RESET according to the sum of reference bit quantities.

18 Claims, 4 Drawing Sheets

(58) Field of Classification Search
CPC .............. H04L 5/0057; H04W 72/042; H04W 72/1263; H04W 72/1231; H04W 72/1284
See application file for complete search history.

(56) References Cited

U.S. PATENT DOCUMENTS

| | | | | |
|---|---|---|---|---|
| 2016/0353388 | A1* | 12/2016 | Han | ............... H04L 1/1678 |
| 2018/0054280 | A1 | 2/2018 | Fu et al. | |
| 2018/0167932 | A1* | 6/2018 | Papasakellariou | ........ H04L 1/00 |
| 2018/0338339 | A1* | 11/2018 | Song | ............... H04W 76/14 |
| 2019/0230685 | A1* | 7/2019 | Park | ............... H04L 5/0094 |
| 2020/0403835 | A1* | 12/2020 | Matsumura | ......... H04L 27/2646 |

FOREIGN PATENT DOCUMENTS

| | | |
|---|---|---|
| CN | 102355325 A | 2/2012 |
| CN | 106060930 A | 10/2016 |
| EP | 2760171 A2 | 7/2014 |
| WO | 2016120461 A1 | 8/2016 |

OTHER PUBLICATIONS

LG Electronics, "Remaining issues on long-duration PUCCH", Feb. 26-Mar. 2, 2018, 3GPP TSG RAN WG1 Meeting #92, Athens, Greece.

Notice of Reasons for Refusal related to Japanese Application No. 2020-553443; reported on Nov. 10, 2021.

Huawel et al.; "Summary for AI 7.1.3.2.2 PUUCH structure in long-duration", 3GPP TSG RAN WG1 Meeting #92, Athens, Greece, Feb. 26-Mar. 2, 2018, R1-1803534.

Catt; "Multiplexing of UCI transmissions of different duration or configurations", 3GPP TSG RAN WG1 Meeting #92, Athens, Greece, Feb. 26-Mar. 2, 2018, R1-1801731.

International Search Report & Written Opinion related to Application No. PCT/CN2019/080080; reported on Oct. 15, 2020.

Chinese Office Action for related Chinese Application No. 201810276613.6; reported on Apr. 7, 2020.

Vivo, "Remaining issues on UCI multiplexing", Jan. 22-26, 2018, 3GPP TSG RAN WG1 NR Meeting AH 1801, Vancouver, Canada.

Qualcomm Incorporated, "Remaining issues for multiplexing UCI on PUSCH", Jan. 22-26, 2018, 3GPP TSG RAN WG1 Meeting AH 1801, Vancouver, Canada.

3rd Generation Partnership Project, "Technical Specification Group Radio Access Network; NR; Physical layer procedures for data", Dec. 2017, 3GPP TS 38.214 V15.0.0.

Korean First Office Action related to Application No. 1020207031271 reported on Sep. 1, 2022.

Huawei, Hisilicon, "Summary for AI 7.1.3.2.2. PUCCH structure in long-duration", Feb. 26-Mar. 2, 2018 3GPP TSG RAN WG1 Meeting #92, Agenda item: 7.1.3.2.2, Athens, Greece, R1-1803450.

* cited by examiner

Determining that a preset PUCCH resource set is a target PUCCH resource set if CSI includes CSI-part 2 —S510

PHYSICAL UPLINK CONTROL CHANNEL RESOURCE DETERMINATION METHOD AND COMMUNICATION DEVICE

CROSS-REFERENCE TO RELATED APPLICATION

This patent application is a bypass continuation under 35 U.S.C. § 111 of PCT Application No, PCT/CN2019/080080 filed on Mar. 28, 2019, which claims priority to Chinese Patent Application No. 201810276613.6 filed in China on Mar. 30, 2018, both of which are incorporated herein by reference in their entireties.

TECHNICAL FIELD

The present disclosure relates to the field of communications technology, in particular to a physical uplink control channel resource determination method and a communication device.

BACKGROUND

In a case that there is an overlap between a time domain position of a physical uplink control channel (Physical Uplink Control Channel, PUCCH) for transmitting HARQ-ACK/NACK (AN)/scheduling request (Scheduling Request, SR) and a time domain position of a PUCCH for transmitting channel state information (Channel State Information, CSI), if the PUCCH for transmitting AN/SR and the PUCCH for transmitting CSI have a same starting symbol, user equipment (User Equipment, UE) selects a PUCCH resource to transmit AN/SR and CSI.

In new radio (New Radio, NR) mobile communication, PUCCH resources are divided into different PUCCH resource sets (PUCCH Resource Sets, PUCCH RESETs) according to a size of uplink control information (Uplink Control Information, UCI) that a PUCCH resource can carry. For example, RESET0: a bit quantity of UCI that can be carried is greater than 0 and no greater than 2 ($0<UCI<=2$); RESET1: a bit quantity of UCI that can be carried is greater than 2 and no greater than N2 ($2<UCI<=N2$); RESET2: a bit quantity of UCI that can be carried is greater than N2 and no greater than N3 ($N2<UCI<=N3$); RESET3: a bit quantity of UCI that can be carried is greater than N3 and no greater than N4 ($N3<UCI<=N4$); wherein N4, N2, N3 are positive integers and are provided by a higher layer, and $N2<N3<N4$.

UE may be configured with one or more (up to 4) PUCCH RESETs and each PUCCH RESET may include multiple PUCCH resources. When a PUCCH for transmitting AN/SR and a PUCCH for transmitting CSI have a same starting symbol, UE firstly determines a PUCCH RESET according to a sum of bit quantities of the AN/SR and the CSI, and then selects one PUCCH resource from the PUCCH RESET for transmitting the AN/SR and the CSI.

However, the sum of bit quantities of AN/SR and CSI is not fixed, such that a base station does not know about the PUCCH RESET from which the UE select a PUCCH resource to transmit AN/SR and CSI, thus the base station needs to perform blind-detection on all possible PUCCH resources.

SUMMARY

Embodiments of the present disclosure provide a physical uplink control channel resource determination method and a communication device.

In a first aspect, an embodiment of the present disclosure provides a physical uplink control channel resource determination method, including:
determining a reference bit quantity of CSI-part 2 according to a preset rule;
determining a sum of reference bit quantities of an AN/SR and CSI according to the reference bit quantity, wherein the CSI at least includes: CSI-part 1 and the CSI-part 2;
determining a target PUCCH resource set according to the sum of reference bit quantities.

In a second aspect, an embodiment of the present disclosure further provides a physical uplink control channel resource determination method, including:
determining that a preset PUCCH resource set is a target PUCCH resource set if CSI includes CSI-part 2.

In a third aspect, an embodiment of the present disclosure further provides a communication device, including:
a first determination module, configured to determine a reference bit quantity of CSI-part 2 according to a preset rule;
a second determination module, configured to determine a sum of reference bit quantities of an AN/SR and CSI according to the reference bit quantity, wherein the CSI at least includes: CSI-part 1 and the CSI-part 2;
a third determination module, configured to determine a target PUCCH resource set according to the sum of reference bit quantities.

In a fourth aspect, an embodiment of the present disclosure further provides a communication device, including a processor, a memory and a computer program stored in the memory and configured to be executed by the processor, wherein the processor is configured to execute the computer program to implement steps of the PUCCH resource determination method as described in the first aspect.

In a fifth aspect, an embodiment of the present disclosure further provides a computer readable storage medium storing therein a computer program, wherein the computer program is configured to be executed by a processor to implement steps of the PUCCH resource determination method as described in the first aspect.

In a sixth aspect, an embodiment of the present disclosure further provides a communication device, including:
a first determination module, configured to determine that a preset PUCCH resource set is a target PUCCH resource set when CSI includes CSI-part 2.

In a seventh aspect, an embodiment of the present disclosure further provides a communication device, including a processor, a memory and a computer program stored in the memory and configured to be executed by the processor, wherein the processor is configured to execute the computer program to implement steps of the PUCCH resource determination method as described in the second aspect.

In an eighth aspect, an embodiment of the present disclosure further provides a computer readable storage medium storing therein a computer program, wherein the computer program is configured to be executed by a processor to implement steps of the PUCCH resource determination method as described in the second aspect.

BRIEF DESCRIPTION OF THE DRAWINGS

The accompanying drawings described here are provided to facilitate a further understanding of the present disclosure and form a part of the present disclosure. The exemplary embodiments and description thereof in the present disclosure serve to explain the present disclosure, and by no means constitute an undue limitation on the present disclosure. In the accompanying drawings.

DETAILED DESCRIPTION

The technical solutions in embodiments of the present disclosure are described clearly and completely in conjunction with drawings in the embodiments of the present disclosure hereinafter. Apparently, the described embodiments are merely a part of, rather than all the embodiments of the present disclosure. All other embodiments obtained by a person of ordinary skill in the art based on the embodiments of the present disclosure without any creative efforts fall within the scope of the present disclosure.

Figure 1:
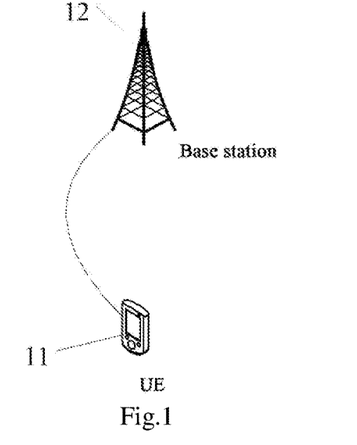
FIG. 1 is a schematic diagram of a network architecture provided in an embodiment of the present disclosure.

Referring to FIG. 1, a schematic diagram of a network architecture provided in an embodiment of the present disclosure is illustrated. As shown in FIG. 1, the network architecture includes a user terminal 11 and a base station 12. The user terminal 11 may be user equipment (User Equipment, UE), for example, a terminal side device such as a mobile phone, a tablet personal computer, a laptop computer, a personal digital assistant (Personal Digital Assistant, PDA), a mobile internet device (Mobile Internet Device, MID) or a wearable device. It is noted, a specific type of the user terminal 11 is not limited in embodiments of the present disclosure. The base station 12 may be a 5th generation (5th Generation, 5 G) or newer base station (e.g., gNB, 5 G NR NodeB (NB)), or a base station in another communication system, or may be referred to as NodeB. It is noted, although a 5G base station is used as an example in embodiments of the present disclosure, a specific type of the base station 12 is not limited thereto.

It is noted, specific functions of the foregoing user terminal 11 and base station 12 are described in detail with reference to following embodiments.

First Embodiment

Figure 2:
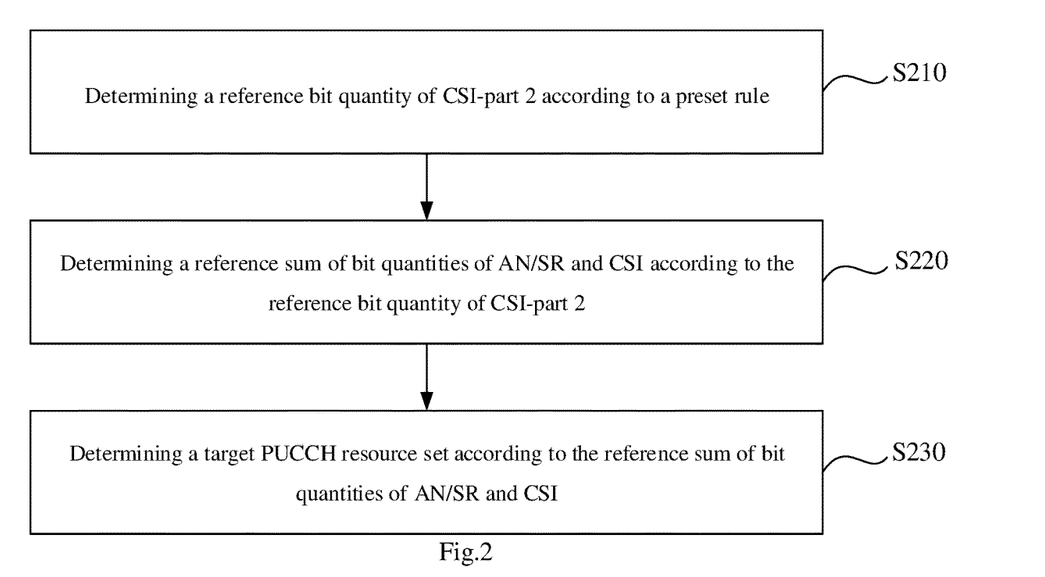
FIG. 2 is a schematic flow diagram of a PUCCH resource determination method provided in an embodiment of the present disclosure.

FIG. 2 is a schematic flow diagram of a PUCCH resource determination method provided in an embodiment of the present disclosure. The method includes:

a step S210: determining a reference bit quantity of CSI-part 2 according to a preset rule.

a step S220: determining a sum of reference bit quantities of AN/SR and CSI according to the reference bit quantity of CSI-part 2, wherein the CSI at least includes: CSI-part 1 and CSI-part 2.

a step S230: determining a target PUCCH resource set according to the sum of reference bit quantities of AN/SR and CSI.

In practical application, if the PUCCH for transmitting AN/SR and the PUCCH for transmitting CSI have a same starting symbol, UE may select a PUCCH resource to transmit AN/SR and CSI.

It is noted, AN/SR represents that AN is included, while SR may be included or may be not included.

Figure 3:
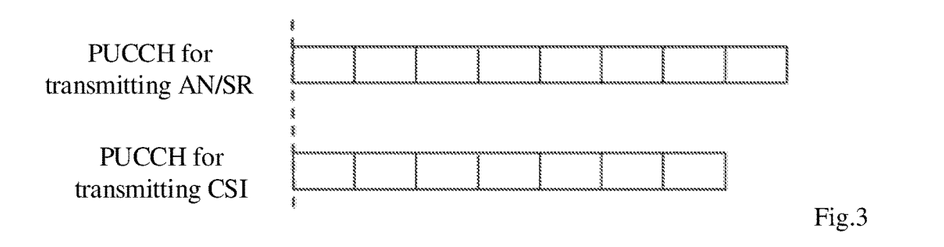
FIG. 3 is a schematic diagram showing a situation in which a PUCCH for transmitting AN/SR and a PUCCH for transmitting CSI have a same starting symbol according to an embodiment of the present disclosure.

FIG. 3 is a schematic diagram showing a situation in which a PUCCH for transmitting AN/SR and a PUCCH for transmitting CSI have a same starting symbol according to an embodiment of the present disclosure.

As shown in FIG. 3, in a same slot, a PUCCH including 8 orthogonal frequency division multiplexing (Orthogonal Frequency Division Multiplexing, OFDM) symbols is used for transmitting AN/SR, a PUCCH including 7 OFDM symbols is used for transmitting CSI, and the PUCCH for transmitting AN/SR and the PUCCH for transmitting CSI have a same starting symbol.

In practical application, UE may be configured with one or more (up to 4) PUCCH resource sets.

Figure 4:
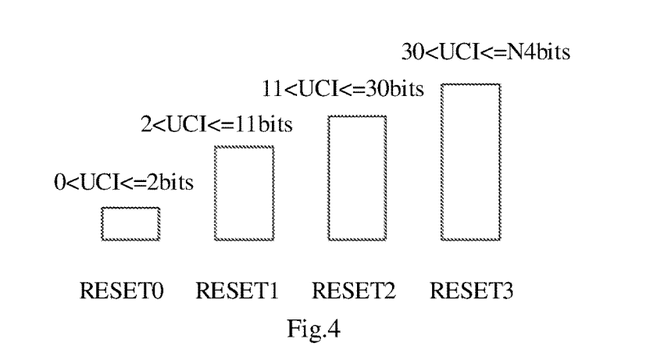
FIG. 4 is a schematic diagram of a PUCCH resource set configured by UE according to an embodiment of the present disclosure.

FIG. 4 is a schematic diagram of a PUCCH resource set configured by UE according to an embodiment of the present disclosure.

As shown in FIG. 4, UE is configured with 4 PUCCH resource sets: RESET0-RESET3. RESET0 may carry UCI with a bit quantity greater than 0 and no greater than 2 bits (0<UCI<=2 bits); RESET1 may carry UCI with a bit quantity greater than 2 bits and no greater than 11 bits (2<UCI<=11 bits); RESET2 may carry UCI with a bit quantity greater than 11 bits and no greater than 30 bits (11<UCI<=30 bits); RESET3 may carry UCI with a bit quantity greater than 30 bits and no greater than N4 bits (30<UCI<=N4 bits).

If UE is configured with plural PUCCH resource sets, UE needs to select a target PUCCH resource set from the plural configured PUCCH resource sets according to a sum of bit quantities of AN/SR and CSI, and then determine a target PUCCH resource for transmitting AN/SR and CSI in the selected target PUCCH resource set.

CSI at least includes two parts: CSI-part 1 and CSI-part 2. The bit quantity of CSI-part 2 is related to rank indication (Rank Indication, RI), and bit quantities of CSI-part 2 corresponding to different RIs may be different. Since the base station does not know which RI will be reported by UE, the base station cannot determine the bit quantity of CSI-part 2, and then cannot determine the sum of bit quantities of AN/SR and CSI, which results in that the base station cannot determine the PUCCH resource set from which UE will select a PUCCH resource to transmit AN/SR and CSI.

In an embodiment of the present disclosure, if the PUCCH for transmitting AN/SR and the PUCCH for transmitting CSI have a same starting symbol and CSI includes CSI-part 2, a reference bit quantity of CSI-part 2 is determined according to a preset rule. The reference bit quantity of CSI-part 2 is used to determine the PUCCH resource set from which UE selects a PUCCH resource to transmit AN/SR and CSI, such that the base station and the UE have a same understanding of the PUCCH resource set used for transmitting AN/SR and CSI.

The preset rule by which the reference bit quantity of CSI-part 2 is determined includes, but is not limited to, the following five implementations.

First Implementation

The reference bit quantity of CSI-part 2 is determined according to bit quantities of CSI-part 2 corresponding to different RIs; wherein the reference bit quantity of CSI-part 2 is a minimum bit quantity of the bit quantities of CSI-part 2 corresponding to different RIs.

For example, at a certain time, the bit quantities of precoding matrix indicators (Precoding Matrix Indicators, PMIs) corresponding to different RIs are as shown in Table 1:

TABLE 1

| RI | Bit quantity of PMI |
|---|---|
| RI = 1 | 13 |
| RI = 2 | 13 |
| RI = 3 or 4 | 7 |
| RI = 5 or 6 | 5 |
| RI = 7 or 8 | 4 |

Assuming parameters configured by a higher layer are as follows: $n_{KT}=8$, $K_s^{CSI-RS}=8$, the bit quantities of RI, channel quality indicator (Channel Quality Indicator, CQI) and channel resource indicator (Channel Resource Indicator, CRI) are as shown in Table 2:

TABLE 2

| | Bit quantity | | | |
|---|---|---|---|---|
| | | | >4 antenna ports | |
| | 2 antenna ports | 4 antenna ports | RI = 1~4 | RI = 5~8 |
| RI | $\min(1, \lceil \log_2 n_{RI} \rceil)$ | $\min(2, \lceil \log_2 n_{RI} \rceil)$ | $\lceil \log_2 n_{RI} \rceil = 3$ | $\lceil \log_2 n_{RI} \rceil = 3$ |
| CQI | 4 | 4 | 4 | 4 + 4 = 8 |
| CRI | $\lceil \log_2(K_s^{CSI-RS}) \rceil$ | $\lceil \log_2(K_s^{CSI-RS}) \rceil$ | $\lceil \log_2(K_s^{CSI-RS}) \rceil = 3$ | $\lceil \log_2(K_s^{CSI-RS}) \rceil = 3$ |

It can be seen from Table 2, when RI=1~4, only one codeword, namely the first codeword, is included, and the bit quantity of CQI of the first codeword is 4; when RI=5~8, two codewords, namely the first codeword and the second codeword, are included, the bit quantity of CQI of the first codeword is 4 and the bit quantity of CQI of the second codeword is 4.

Therefore, the bit quantity of CSI-part 1=bit quantity of RI+bit quantity of CRI+bit quantity of CQI of the first codeword=3+3+4=10 bits; the bit quantity of CSI-part 2=bit quantity of PMI+bit quantity of CQI of the second codeword, the bit quantities of CSI-part 2 are as shown in Table 3:

TABLE 3

| RI | Bit quantity of PMI | Bit quantity of CQI of the second codeword | Bit quantity of CSI part 2 |
|---|---|---|---|
| RI = 1 | 13 | 0 | 13 |
| RI = 2 | 13 | 0 | 13 |
| RI = 3 or 4 | 7 | 0 | 7 |
| RI = 5 or 6 | 5 | 4 | 9 |
| RI = 7 or 8 | 4 | 4 | 8 |

The reference bit quantity of CSI-part 2 is a minimum bit quantity of the bit quantities of CSI-part 2 corresponding to different RIs, that is, the reference bit quantity of CSI-part 2 is 7 bits.

If the bit quantity of AN/SR is 10 bits, according to the reference bit quantity of CSI-part 2, it may be determined that the sum of reference bit quantities of AN/SR and CSI=the bit quantity of AN/SR+the bit quantity of CSI-part 1+the reference bit quantity of CSI-part 2=10+10+7=27 bits.

If PUCCH resource sets configured for the UE are as shown in FIG. 4, it is determined, according to the sum of reference bit quantities of AN/SR and CSI which is 27 bits, that the target PUCCH resource set is RESET2.

Second Implementation

The reference bit quantity of CSI-part 2 is determined according to bit quantities of CSI-part 2 corresponding to different RIs; wherein the reference bit quantity of CSI-part 2 is a maximum bit quantity of the bit quantities of CSI-part 2 corresponding to different RIs.

Still taking the above Table 1 to Table 3 for example, the reference bit quantity of CSI-part 2 is a maximum bit quantity of the bit quantities of CSI-part 2 corresponding to different RIs, that is, the reference bit quantity of CSI-part 2 is 13 bits.

If the bit quantity of AN/SR is 10 bits, according to the reference bit quantity of CSI-part 2, it may be determined that the sum of reference bit quantities of AN/SR and CSI=the bit quantity of AN/SR+the bit quantity of CSI-part 1+the reference bit quantity of CSI-part 2=10+10+13=33 bits.

If PUCCH resource sets configured for the UE are as shown in FIG. 4, it is determined, according to the sum of reference bit quantities of AN/SR and CSI which is 33 bits, that the target PUCCH resource set is RESET3.

Third Implementation

The reference bit quantity of CSI-part 2 is determined according to bit quantities of CSI-part 2 corresponding to different RIs; wherein the reference bit quantity of CSI-part 2 is a bit quantity of CSI-part 2 corresponding to a preset RI.

For example, the bit quantity of CSI-part 2 corresponding to a preset RI is less than a maximum bit quantity of the bit quantities of CSI-part 2 corresponding to different RIs, and is greater than a minimum bit quantity of the bit quantities of CSI-part 2 corresponding to different RIs.

Still taking the above Table 1 to Table 3 for example, assuming the preset RI is 5 or 6, the reference bit quantity of CSI-part 2 is a bit quantity of CSI-part 2 corresponding to a RI of 5 or 6, that is, the reference bit quantity of CSI-part 2 is 9 bits, wherein the bit quantity of CSI-part 2 corresponding to a RI of 5 or 6 is 9 bits, which is less than the maximum bit quantity, namely 13 bits, of the bit quantities of CSI-part 2 corresponding to different RIs, and is greater than the minimum bit quantity, namely 8 bits, of the bit quantities of CSI-part 2 corresponding to different RIs.

Optionally, the preset RI is determined in one of following manners:

the preset RI is specified in a protocol;

the preset RI is configured by a network side device;

the preset RI is indicated implicitly.

It is noted, apart from the above three manners, the preset RI may also be determined in other manners, which is not specifically limited herein.

If the bit quantity of AN/SR is 10 bits, according to the reference bit quantity of CSI-part 2, it may be determined that the sum of reference bit quantities of AN/SR and CSI=the bit quantity of AN/SR+the bit quantity of CSI-part 1+the reference bit quantity of CSI-part 2=10+10+9=29 bits.

If PUCCH resource sets configured for the UE are as shown in FIG. 4, it is determined, according to the sum of reference bit quantities of AN/SR and CSI which is 29 bits, that the target PUCCH resource set is RESET2.

Fourth Implementation

It is determined that a bit quantity of CSI-part 2 corresponding to an RI last reported by UE to a network side device is the reference bit quantity of CSI-part 2.

UE assumes that the reference bit quantity of CSI-part 2 is a bit quantity of CSI-part 2 obtained according to an RI last reported by UE to a base station.

Still taking the above Table 1 to Table 3 for example, if the RI last reported by UE to a base station is 7, the reference bit quantity of CSI-part 2 is a bit quantity of CSI-part 2 obtained according to a RI of 7, that is, the reference bit quantity of CSI-part 2 is 8 bits.

If the bit quantity of AN/SR is 10 bits, according to the reference bit quantity of CSI-part 2, it may be determined that the sum of reference bit quantities of AN/SR and CSI=the bit quantity of AN/SR+the bit quantity of CSI-part 1+the reference bit quantity of CSI-part 2=10+10+8=28 bits.

If PUCCH resource sets configured for the UE are as shown in FIG. 4, it is determined, according to the sum of reference bit quantities of AN/SR and CSI which is 28 bits, that the target PUCCH resource set is RESET2.

Fifth Implementation

It is determined that the reference bit quantity of CSI-part 2 is 0.

To avoid base station blind-detection, UE assumes that there is only AN/SR and there is no CSI-part 2 or CSI, such that the sum of bit quantities of AN/SR and CSI remains fixed.

In an embodiment, it is determined that the reference bit quantity of CSI-part 2 is 0, that is, UE assumes that there is only AN/SR and CSI-part 1 and there is no CSI-part 2.

Still taking the above Table 1 to Table 2 for example, if the bit quantity of AN/SR is 10 bits, it may be determined that the sum of reference bit quantities of AN/SR and CSI=the bit quantity of AN/SR+the bit quantity of CSI-part 1+the reference bit quantity of CSI-part 2=10+10+0=20 bits.

If PUCCH resource sets configured for the UE are as shown in FIG. 4, it is determined, according to the sum of reference bit quantities of AN/SR and CSI which is 20 bits, that the target PUCCH resource set is RESET2.

In another embodiment, it is determined that the reference bit quantity of CSI-part 2 is 0 and the reference bit quantity of CSI-part 1 is also 0, that is, UE assumes that there is only AN/SR and there is no CSI.

If the bit quantity of AN/SR is 10 bits, it may be determined that the sum of reference bit quantities of AN/SR and CSI=the bit quantity of AN/SR+the reference bit quantity of CSI-part 1+the reference bit quantity of CSI-part 2=10+0+0=10 bits.

If PUCCH resource sets configured for the UE are as shown in FIG. 4, it is determined, according to the sum of reference bit quantities of AN/SR and CSI which is 10 bits, that the target PUCCH resource set is RESET1.

When the method for determining a target PUCCH resource set is applied to UE, after determining the target PUCCH resource set, the UE further performs the following steps:

determining a target PUCCH resource in the target PUCCH resource set according to an ACK/NACK resource indicator (ACK/NACK Resource Indicator, ARI) included in downlink control information (Downlink Control Information, DCI);

transmitting the AN/SR and the CSI according to the target PUCCH resource.

A target PUCCH resource set carrying relatively few UCI bits (less than or equal to 2 bits) includes at least 8 (up to 32) PUCCH resources.

If there are more than 8 PUCCH resources in the target PUCCH resource set, the target PUCCH resource for transmitting AN/SR and CSI may be determined by means of a 3-bit ARI+implicit indication.

If there are 8 PUCCH resources in the target PUCCH resource set, the target PUCCH resource for transmitting AN/SR and CSI may be determined by means of a 3-bit ARI.

A PUCCH resource set carrying relatively more bits (more than 2 bits) includes 8 PUCCH resources. The target PUCCH resource for transmitting AN/SR and CSI may be determined by means of a 3-bit ARI.

When the method for determining a target PUCCH resource set is applied to a network side device, after determining the target PUCCH resource set, the network side device further performs the following steps:

determining a target PUCCH resource in the target PUCCH resource set according to an ARI included in DCI;

performing detection on the target PUCCH resource.

Having determined the target PUCCH resource, the network side device is aware that UE will transmit AN/SR and CSI on the target PUCCH resource, therefore the network side device may perform detection on the target PUCCH resource, rather than performing blind-detection on all PUCCH resources.

In technical solutions set forth in embodiments of the present disclosure, a reference bit quantity of CSI-part 2 is determined according to a preset rule; a sum of reference bit quantities of an AN/SR and CSI is determined according to the reference bit quantity of CSI-part 2, wherein the CSI at least includes: CSI-part 1 and CSI-part 2; and a target PUCCH resource set is determined according to the sum of reference bit quantities of an AN/SR and CSI. Thus, PUCCH resource set used for transmitting the AN/SR and CSI may be determined more accurately, thereby effectively avoiding the problem of base station blind-detection.

Second Embodiment

Figure 5:
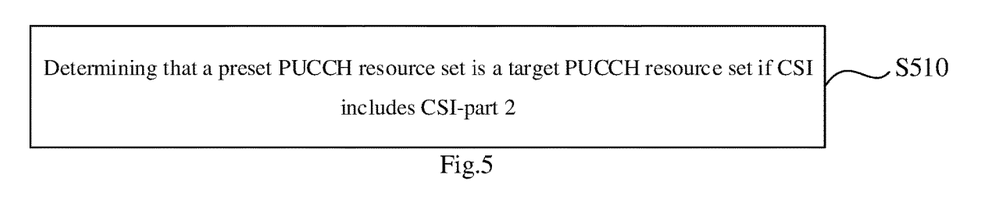
FIG. 5 is another schematic flow diagram of a PUCCH resource determination method provided in an embodiment of the present disclosure.

FIG. 5 is another schematic flow diagram of a PUCCH resource determination method provided in an embodiment of the present disclosure. The method includes a step S510: determining that a preset PUCCH resource set is a target PUCCH resource set if CSI includes CSI-part 2.

UE and a base station determine a preset PUCCH resource set, such that if the PUCCH for transmitting AN/SR and the PUCCH for transmitting CSI have a same starting symbol and the CSI includes CSI-part 2, it may be determined that a preset PUCCH resource set is a target PUCCH resource set, so that the base station and the UE have a same understanding of the PUCCH resource set used for transmitting AN/SR and CSI.

Optionally, the preset PUCCH resource set may carry a maximum quantity of UCI bits in comparison with other PUCCH resource sets.

For example, it is determined that the RESET3 which is capable of carrying a maximum quantity of UCI bits is the present PUCCH resource set.

It is noted, apart from the PUCCH resource set capable of carrying a maximum quantity of UCI bits, the preset PUCCH resource set may be other PUCCH resource set, which is not specifically limited herein.

When the method for determining a target PUCCH resource set is applied to UE, after determining the target PUCCH resource set, the UE further performs the following steps:

determining a target PUCCH resource in the target PUCCH resource set according to an ARI included in DCI;

transmitting the AN/SR and the CSI according to the target PUCCH resource.

A target PUCCH resource set carrying relatively few UCI bits (less than or equal to 2 bits) includes at least 8 (up to 32) PUCCH resources.

If there are more than 8 PUCCH resources in the target PUCCH resource set, the target PUCCH resource for transmitting AN/SR and CSI may be determined by means of a 3-bit ARI+implicit indication.

If there are 8 PUCCH resources in the target PUCCH resource set, the target PUCCH resource for transmitting AN/SR and CSI may be determined by means of a 3-bit ARI.

A PUCCH resource set carrying relatively more bits (more than 2 bits) includes 8 PUCCH resources. The target PUCCH resource for transmitting AN/SR and CSI may be determined by means of a 3-bit ARI.

When the method for determining a target PUCCH resource set is applied to a network side device, after determining the target PUCCH resource set, the network side device further performs the following steps:

determining a target PUCCH resource in the target PUCCH resource set according to an ARI included in DCI;

performing detection on the target PUCCH resource.

Having determined the target PUCCH resource, the network side device is aware that UE will transmit AN/SR and CSI on the target PUCCH resource, therefore the network side device may perform detection on the target PUCCH resource, rather than performing blind-detection on all PUCCH resources.

In technical solutions set forth in embodiments of the present disclosure, it is determined that a preset PUCCH resource set is a target PUCCH resource set if CSI includes CSI-part 2. Thus, PUCCH resource set used for transmitting the AN/SR and CSI may be determined more accurately, thereby effectively avoiding the problem of base station blind-detection.

Third Embodiment

Figure 6:
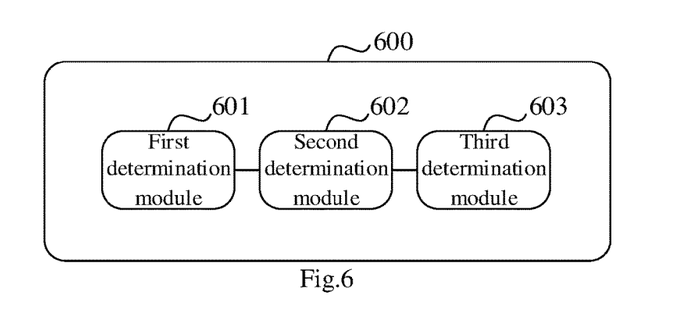
FIG. 6 is a schematic structural diagram of a communication device provided in an embodiment of the present disclosure.

FIG. 6 is a schematic structural diagram of a communication device provided in an embodiment of the present disclosure. A communication device 600 as shown in FIG. 6 includes:

a first determination module 601, configured to determine a reference bit quantity of CSI-part 2 according to a preset rule;

a second determination module 602, configured to determine a sum of reference bit quantities of an AN/SR and CSI according to the reference bit quantity, wherein the CSI at least includes: CSI-part 1 and the CSI-part 2;

a third determination module 603, configured to determine a target PUCCH resource set according to the sum of reference bit quantities.

Optionally, the preset rule includes: determining the reference bit quantity of CSI-part 2 according to bit quantities of CSI-part 2 corresponding to different RIs.

Optionally, the reference bit quantity of CSI-part 2 is a minimum bit quantity of the bit quantities of CSI-part 2 corresponding to different RIs.

Optionally, the reference bit quantity of CSI-part 2 is a maximum bit quantity of the bit quantities of CSI-part 2 corresponding to different RIs.

Optionally, the reference bit quantity of CSI-part 2 is a bit quantity of CSI-part 2 corresponding to a preset RI.

Optionally, the preset RI is determined in one of following manners:

the preset RI is specified in a protocol;

the preset RI is configured by a network side device;

the preset RI is indicated implicitly.

Optionally, the preset rule includes: determining that a bit quantity of CSI-part 2 corresponding to an RI last reported by UE to a network side device is the reference bit quantity of CSI-part 2.

Optionally, the preset rule includes: determining that the reference bit quantity is 0.

Optionally, the communication device 600 further includes: a fourth determination module, configured to determine that a reference bit quantity of the CSI-part 1 is 0.

Optionally, when the communication device 600 is UE, the communication device 600 further includes:

a fifth determination module, configured to determine a target PUCCH resource in the target PUCCH resource set according to an ARI included in DCI;

a transmission module, configured to transmit the AN/SR and the CSI according to the target PUCCH resource.

The communication device 600 provided in the embodiment of the present disclosure may achieve various processes implemented by a communication device in the method embodiment of FIG. 2. To avoid repetition, a detailed description is omitted herein.

It is noted, the communication device 600 may be UE or a network side device, which is not specifically limited herein.

Fourth Embodiment

Figure 7:
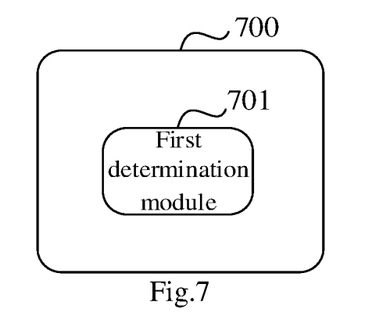
FIG. 7 is another schematic structural diagram of a communication device provided in an embodiment of the present disclosure.

FIG. 7 is another schematic structural diagram of a communication device provided in an embodiment of the present disclosure. A communication device 700 as shown in FIG. 7 includes: a first determination module 701, configured to determine that a preset PUCCH resource set is a target PUCCH resource set when CSI includes CSI-part 2.

Optionally, the preset PUCCH resource set has a maximum capacity for carrying UCI bits in comparison with other PUCCH resource sets.

Optionally, when the communication device 700 is UE, the communication device 700 further includes:

a second determination module, configured to determine a target PUCCH resource in the target PUCCH resource set according to an ARI included in DCI;

a transmission module, configured to transmit AN/SR and the CSI according to the target PUCCH resource.

The communication device 700 provided in the embodiment of the present disclosure may achieve various processes implemented by a communication device in the method embodiment of FIG. 5. To avoid repetition, a detailed description is omitted herein.

It is noted, the communication device 700 may be UE or a network side device, which is not specifically limited herein.

Fifth Embodiment

Figure 8:
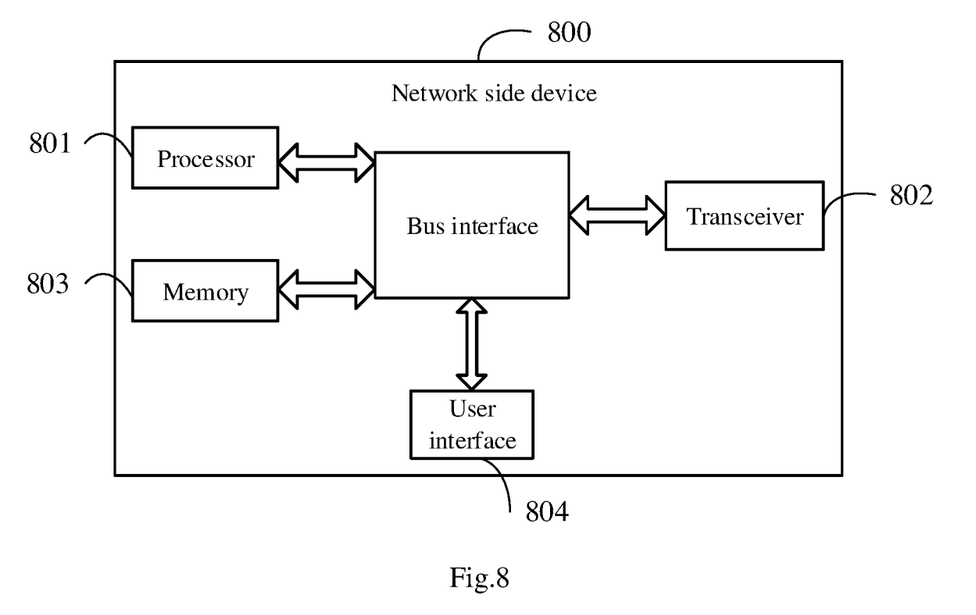
FIG. 8 is a schematic structural diagram of a network side device provided in an embodiment of the present disclosure.

Referring to FIG. 8, a schematic structural diagram of a network side device provided in an embodiment of the present disclosure is illustrated. The network side device can implement details of the methods of the embodiments as shown in FIG. 2 and/or FIG. 5 and achieve the same effects. As shown in FIG. 8, a network side device 800 includes: a processor 801, a transceiver 802, a memory 803, a user interface 804 and a bus interface.

In an embodiment of the present disclosure, the network side device 800 further includes a computer program stored in the memory 803 and executable by the processor 801, wherein the processor 801 is configured to execute the computer program to implement the following steps:

determining a reference bit quantity of CSI-part 2 according to a preset rule; determining a sum of reference bit quantities of an AN/SR and CSI according to the reference bit quantity, wherein the CSI at least includes: CSI-part 1 and the CSI-part 2; determining a target PUCCH resource set according to the sum of reference bit quantities;

and/or, determining that a preset PUCCH resource set is a target PUCCH resource set if CSI includes CSI-part 2.

In FIG. 8, a bus architecture may include any quantity of interconnected buses and bridges, and connects various circuits including one or more processors represented by the processor 801 and memory represented by the memory 803. The bus architecture may also connect various other circuits such as peripherals, voltage regulators and power management circuits, which is well known in the art. Therefore, a further description thereof is omitted herein. A bus interface provides an interface. The transceiver 802 may be multiple elements, such as a transmitter and a receiver, to allow for communication with various other apparatuses on the transmission medium. For different user equipment, the user interface 804 may be an interface capable of connect a desired device externally or internally. The connected device includes, but is not limited to: a keypad, a display, a loudspeaker, a microphone, a joystick, and the like.

The processor 801 is responsible for supervising the bus architecture and normal operation, and the memory 803 may store the data being used by the processor 801 during operation.

The network side device 800 may achieve various processes implemented by a communication device in the embodiments as shown in FIG. 2 and/or FIG. 5. To avoid repetition, a detailed description thereof is omitted herein.

An embodiment of the present disclosure further provides a computer readable storage medium storing therein a computer program, wherein the computer program is configured to be executed by a processor to implement various processes of the embodiments of the methods as shown in FIG. 2 and/or FIG. 5, and may achieve the same technical effects. To avoid repetition, a detailed description thereof is omitted herein. The computer readable storage medium includes a read-only memory (Read-Only Memory, abbreviated as ROM), a random access memory (Random Access Memory, abbreviated as RAM), a magnetic disk, an optic disc or the like.

Figure 9:
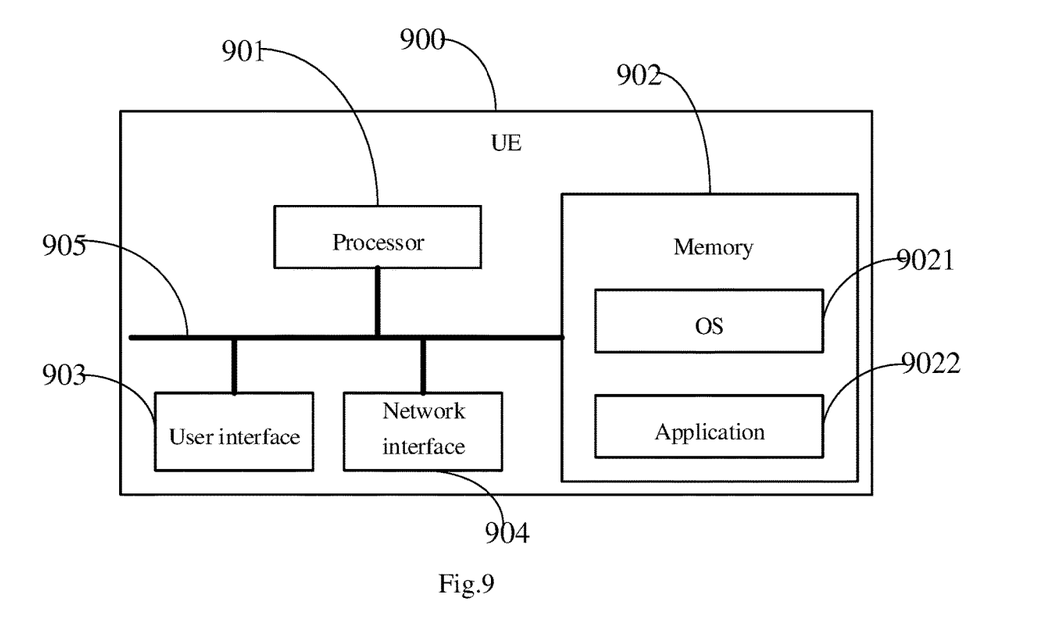
FIG. 9 is a schematic structural diagram of user equipment provided in an embodiment of the present disclosure.

FIG. 9 is a schematic structural diagram of user equipment provided in an embodiment of the present disclosure. The UE 900 as shown in FIG. 9 includes: at least one processor 901, a memory 902, at least one network interface 904, and a user interface 903. The various components in the UE 900 are coupled together by a bus system 905. It may be understood that the bus system 905 is configured to implement connection and communication among these components. The bus system 905 further includes a power bus, a control bus, and a status signal bus in addition to a data bus. However, for clarity of description, various buses in FIG. 9 are all labeled as the bus system 905.

The user interface 903 may include a display, a keyboard or a point-and-click device (for example, a mouse), a trackball, a touch pad, a touch screen, or the like.

It may be understood that the memory 902 in embodiments of the present disclosure may be a volatile memory or a nonvolatile memory, or may include both a volatile memory and a nonvolatile memory. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM), which is used as an external cache. By way of example rather than limitation, many forms of RAMs such as a static RAM (Static RAM, SRAM), a dynamic RAM (Dynamic RAM, DRAM), a synchronous DRAM (Synchronous DRAM, SDRAM), a double-data-rate SDRAM (Double Data Rate SDRAM, DDRSDRAM), an enhanced SDRAM (Enhanced SDRAM, ESDRAM), a synchlink DRAM (Synchlink DRAM, SLDRAM), and a direct Rambus RAM (Direct Rambus RAM, DRRAM) may be used. The memory 902 in the system and method described in embodiments of the present disclosure is intended to include, but is not limited to, these and any other appropriate types of memory.

In some implementations, the memory 902 stores executable modules or data structures, or a subset thereof, or an extended set thereof, for example, an operating system (Operating System, OS) 9021 and an application 9022.

The operating system 9021 includes various system programs, such as a framework layer program, a core library layer program, and a driver layer program, to implement various basic services and process a hardware-based task. The application 9022 includes various applications such as a media player or a browser, to implement various application services. A program for implementing the method provided in embodiments of the present disclosure may be included in the application 9022.

In embodiments of the present disclosure, the UE 900 further includes a computer program stored in the memory 902 and configured to be executed by the processor 901. The processor 901 is configured to execute the computer program to implement the following steps:

determining a reference bit quantity of CSI-part 2 according to a preset rule; determining a sum of reference bit quantities of an AN/SR and CSI according to the reference bit quantity, wherein the CSI at least includes: CSI-part 1 and the CSI-part 2; determining a target PUCCH resource set according to the sum of reference bit quantities;

and/or, determining that a preset PUCCH resource set is a target PUCCH resource set if CSI includes CSI-part 2.

The foregoing methods disclosed in embodiments of the present disclosure may be applied to the processor 901 or implemented by the processor 901. The processor 901 may be an integrated circuit chip having a signal processing capability. During implementation, the steps in the foregoing methods may be accomplished by hardware integrated logic circuits or instructions in a software form in the processor 901. The processor 901 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or other programmable logic device, discrete gate or transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps in the method disclosed with reference to some embodiments of the present disclosure may be directly performed and accomplished by a hardware decoding processor, or performed and accomplished by a combination of hardware and software modules in a decoding processor. The software modules may reside in a computer-readable storage medium well-established in the art, such as a RAM, a flash memory, a ROM, a PROM or an electrically erasable programmable memory or a register. A computer-readable storage medium is located in the memory 902. The processor 901 reads information from the memory 902 and accomplishes the steps in the foregoing methods using hardware of the processor 901. Specifically, a computer program is stored in the computer-readable storage medium. The computer program is configured to be executed by the processor 901 to implement the steps in the foregoing method embodiments as shown in FIG. 2 and/or FIG. 5.

It may be understood that these embodiments described in this disclosure may be implemented by hardware, software, firmware, middleware, microcode or a combination thereof. For hardware implementation, a processing unit may be implemented in one or more ASICs, a DSP, a DSP device (DSP Device, DSPD), a programmable logic device (Programmable Logic Device, PLD), an FPGA, a general-purpose processor, a controller, a microcontroller, a microprocessor, other electronic unit configured to perform the functions in the present disclosure or a combination thereof.

For a software implementation, the techniques described in embodiments of the present disclosure may be implemented by modules (for example, processes or functions) performing the functions described in embodiments of the present disclosure. Software codes may be stored in a memory and executed by a processor. The memory may be implemented internal or external to a processor.

The UE 900 may achieve various processes implemented by a communication device in the embodiments as shown in FIG. 2 and/or FIG. 5. To avoid repetition, a detailed description thereof is omitted herein.

An embodiment of the present disclosure further provides a computer readable storage medium storing therein a computer program, wherein the computer program is configured to be executed by a processor to implement various processes of the method embodiments as shown in FIG. 2 and/or FIG. 5, and may achieve the same technical effects. To avoid repetition, a detailed description thereof is omitted herein. The computer readable storage medium includes a read-only memory (Read-Only Memory, abbreviated as ROM), a random access memory (Random Access Memory, abbreviated as RAM), a magnetic disk, an optic disc or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the methods according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a mobile phone, a computer, a server, an air conditioner or a network device) to perform the methods according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A physical uplink control channel (PUCCH) resource determination method, comprising:
    determining a reference bit quantity of channel state information (CSI)-part 2 according to a preset rule;
    determining a sum of reference bit quantities of an HARQ-ACK/NACK (AN)/scheduling request (SR) and CSI according to the reference bit quantity, wherein the CSI at least comprises: CSI-part 1 and the CSI-part 2;
    determining a target PUCCH resource set according to the sum of reference bit quantities;
    wherein the preset rule comprises:
    determining that a bit quantity of CSI-part 2 corresponding to an RI last reported by user equipment (UE) to a network side device is the reference bit quantity.

2. The method according to claim 1, wherein the preset rule comprises:
    determining the reference bit quantity according to bit quantities of CSI-part 2 corresponding to different rank indications (RIs).

3. The method according to claim 2, wherein the reference bit quantity is a minimum bit quantity of the bit quantities of CSI-part 2 corresponding to different RIs.

4. The method according to claim 2, wherein the reference bit quantity is a maximum bit quantity of the bit quantities of CSI-part 2 corresponding to different RIs.

5. The method according to claim 2, wherein the reference bit quantity is a bit quantity of CSI-part 2 corresponding to a preset RI.

6. The method according to claim 5, wherein the preset RI is determined in one of following manners:
    the preset RI is specified in a protocol;
    the preset RI is configured by a network side device;
    the preset RI is indicated implicitly.

7. The method according to claim 1, wherein the preset rule comprises:
    determining that the reference bit quantity is 0.

8. The method according to claim 7, wherein the method further comprises:
    determining that a reference bit quantity of the CSI-part 1 is 0.

9. The method according to claim 1, wherein, when the method is applied to user equipment (UE), the method further comprises:
    determining a target PUCCH resource in the target PUCCH resource set according to an ACK/NACK resource indicator (ARI) comprised in downlink control information (DCI);
    transmitting the AN/SR and the CSI according to the target PUCCH resource.

10. A communication device, comprising a memory, a processor and a computer program stored in the memory and configured to be executed by the processor, wherein the processor is configured to execute the computer program to implement a physical uplink control channel (PUCCH) resource determination method, the method comprising:
    determining a reference bit quantity of channel state information (CSI)-part 2 according to a preset rule;
    determining a sum of reference bit quantities of an HARQ-ACK/NACK (AN)/scheduling request (SR) and CSI according to the reference bit quantity, wherein the CSI at least comprises: CSI-part 1 and the CSI-part 2;
    determining a target PUCCH resource set according to the sum of reference bit quantities;
    wherein the preset rule comprises:
    determining that a bit quantity of CSI-part 2 corresponding to an RI last reported by user equipment (UE) to a network side device is the reference bit quantity.

11. The communication device according to claim 10, wherein in the PUCCH resource determination method, the preset rule comprises:
    determining the reference bit quantity according to bit quantities of CSI-part 2 corresponding to different rank indications (RIs).

12. The communication device according to claim 11, wherein in the PUCCH resource determination method, the reference bit quantity is a minimum bit quantity of the bit quantities of CSI-part 2 corresponding to different RIs, or the reference bit quantity is a maximum bit quantity of the bit quantities of CSI-part 2 corresponding to different RIs.

13. The communication device according to claim 11, wherein in the PUCCH resource determination method, the reference bit quantity is a bit quantity of CSI-part 2 corresponding to a preset RI.

14. The communication device according to claim 13, wherein in the PUCCH resource determination method, the preset RI is determined in one of following manners:
    the preset RI is specified in a protocol;
    the preset RI is configured by a network side device;
    the preset RI is indicated implicitly.

15. The communication device according to claim 10, wherein in the PUCCH resource determination method, the preset rule comprises:
    determining that the reference bit quantity is 0.

16. The communication device according to claim 15, wherein the PUCCH resource determination method further comprises:
    determining that a reference bit quantity of the CSI-part 1 is 0.

17. The communication device according to claim 10, wherein in the PUCCH resource determination method, when the method is applied to user equipment (UE), the method further comprises:
    determining a target PUCCH resource in the target PUCCH resource set according to an ACK/NACK resource indicator (ARI) comprised in downlink control information (DCI);
    transmitting the AN/SR and the CSI according to the target PUCCH resource.

18. A non-transitory computer readable storage medium storing therein a computer program, wherein the computer program is configured to be executed by a processor to implement steps of a physical uplink control channel (PUCCH) resource determination method, the method comprising:
    determining a reference bit quantity of channel state information (CSI)-part 2 according to a preset rule;
    determining a sum of reference bit quantities of an HARQ-ACK/NACK (AN)/scheduling request (SR) and CSI according to the reference bit quantity, wherein the CSI at least comprises: CSI-part 1 and the CSI-part 2;
    determining a target PUCCH resource set according to the sum of reference bit quantities;
    wherein the preset rule comprises:
    determining that a bit quantity of CSI-part 2 corresponding to an RI last reported by user equipment (UE) to a network side device is the reference bit quantity.

* * * * *